3,248,300
METHOD OF RECOVERING CARPAINES FROM PAPAYA PLANTS
Everette M. Burdick, 4821 Ronda St., Coral Gables, Fla.
Filed July 20, 1964, Ser. No. 383,889
19 Claims. (Cl. 195—2)

The present application is a continuation-in-part of my prior copending application Serial No. 1,050 filed January 7, 1960, now United States Letters Patent No. 3,141,832.

The present invention relates to a method for recovering carpaines from papaya plants. The term papaya plants as used in the following specification and claims includes all the species of papaya including by way of example, Carica papaya, Linn. family Caricaceae; *Carica candamarcencis*, Hook.; *Carica dodecaphylla; Carica quercifolia*, Solms.; *Carica hasatefolia*, Solms.; *Garica gracilis*, Solms.; *Carica monoica; Carica cauliflora; Carica chrysopeala; Carica pentagona; Papaya Carica*, Gaertn.; *Vasconcellosia hastata*, Caruel, and Apocynaceae.

Heretofore, prior methods of recovering carpaines from papaya have been limited to obtaining it from the dried leaves of the papaya plant by means of a very costly laboratory technique. The method of collecting the leaves and their preparation for treatment by prior methods is expensive and time consuming. Additionally, when carpaines are recovered from the dried leaves of the papaya plant by prior processes, the proteolytic enzymes, chlorophylls, and carotenoids are destroyed during the drying so that they cannot be recovered from the papaya plant.

The present invention overcomes the above and other problems in recovering carpaines from papaya and provides a process for recovering carpaines from the entire air portions of the papaya plant, that is, the trunk, stems, and leaves.

Therefore, the primary object of the present invention is to provide a process of recovering commercial quantities of carpaines from the entire portion of the papaya plant.

Still another object of the present invention is to provide a method for treating the papaya plant for recovery of desired constituents therefrom.

Still another object of the present invention is to recover carpaines from papaya without destroying the other valuable constituents such as the proteolytic enzymes, chlorophylls, and carotenoids.

Still another object of the present invention is to provide a method of recovering carpaines from papaya by means of an economical and commercially practical method.

Other objects and advantages of the present invention will become more readily apparent from a consideration of the following description and drawings wherein.

Figure 1:
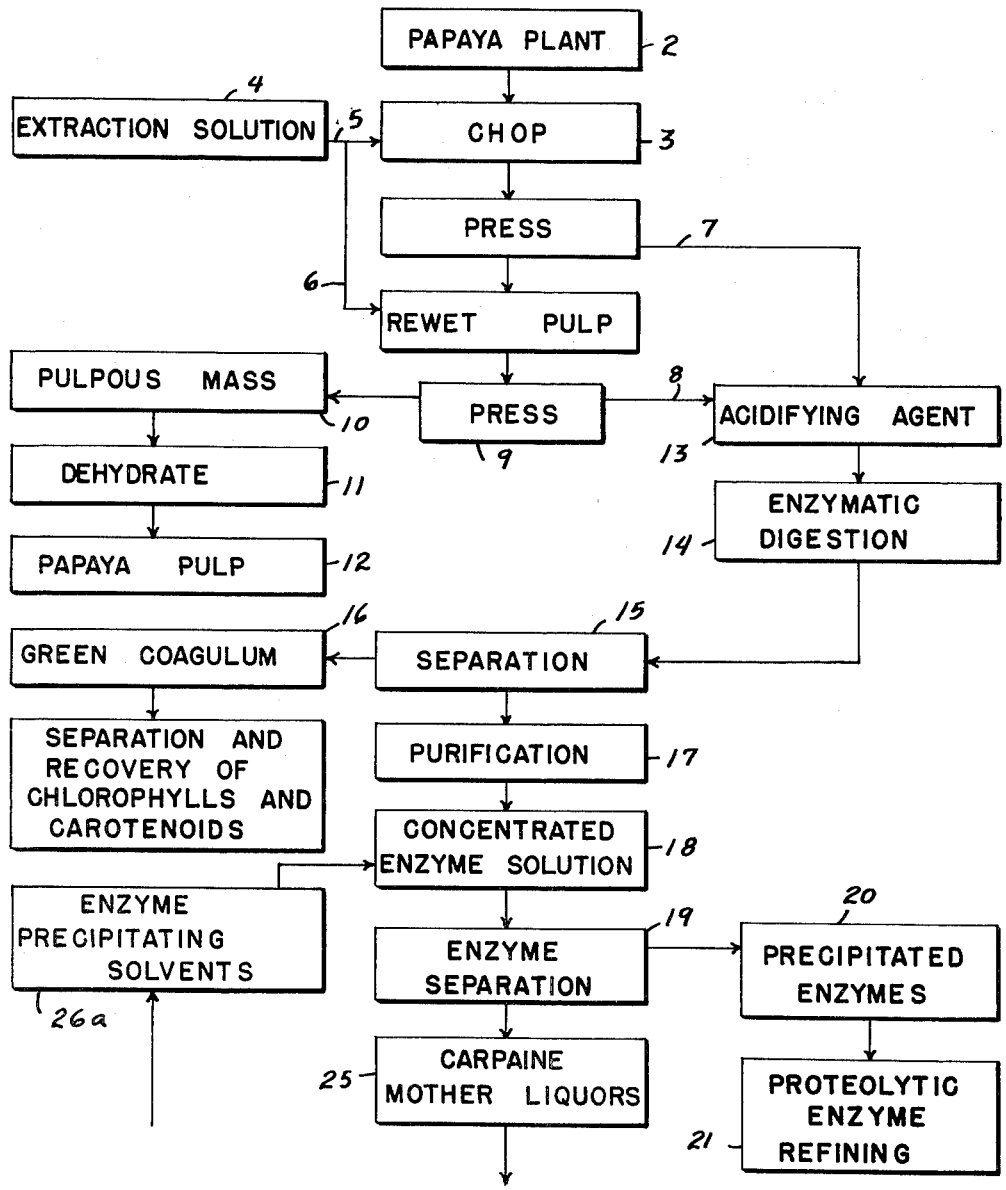
FIG. 1 is a schematic flow sheet illustrating the process.
Figure 2:
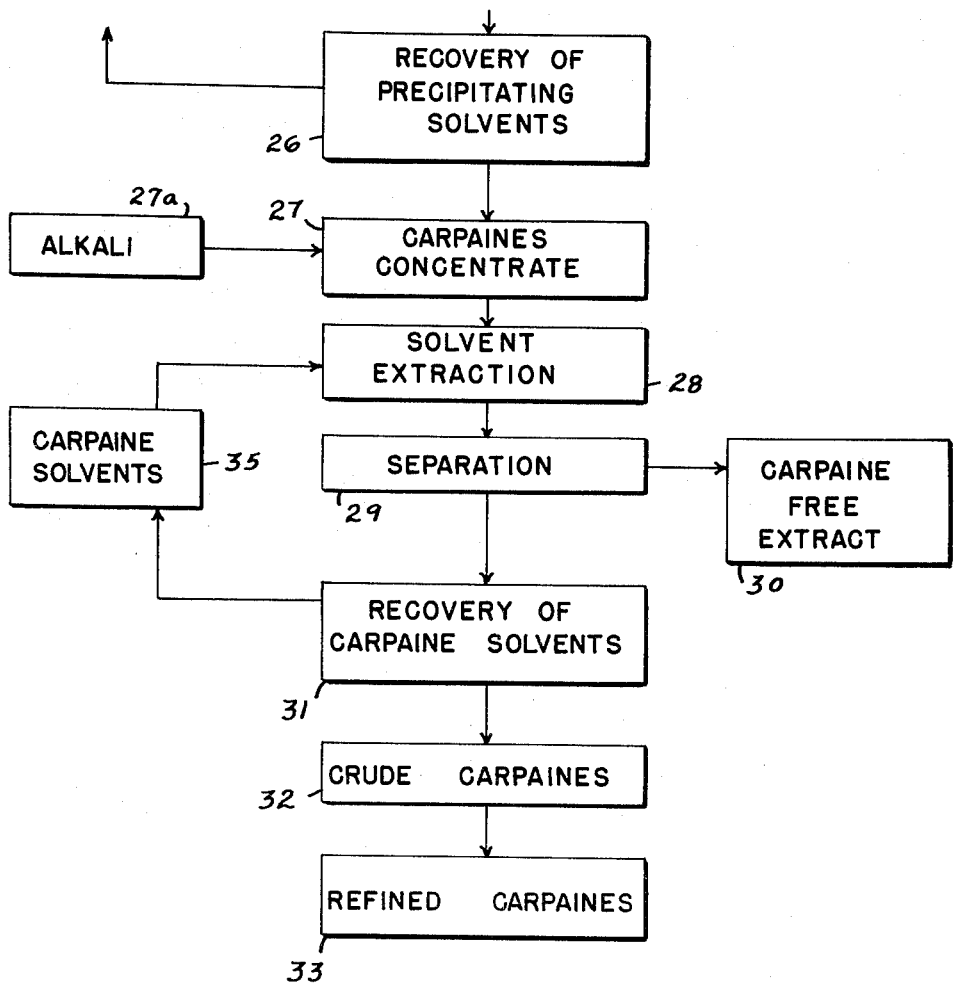
FIG. 2 is a continuation of FIG. 1.

A suitable method of growing or cultivating papaya plants is described in my copending application Serial No. 1,050 filed January 7, 1960, now U.S. Letters Patent No. 3,141,832, issued July 21, 1964. It can be appreciated that certain variations in the method of growing and cultivation can be utilized without affecting the results of the present invention.

When the plants are of a suitable height, such as, for example, about two to three feet tall, they may be harvested mechanically by a conventional forage harvester or by any suitable other means, and the plants may be cut a suitable height above the ground so that the roots may put out new tops, such as, by way of example, anywhere from 9 to 12 inches above ground.

From the foregoing, it can be appreciated that the above procedure eliminates the necessity of collecting and drying only the papaya leaves for obtaining the carpaines therefrom. Also, such procedure enables not only the leaves but also the stems and trunks of the plants to be used for the production of carpaines but it enables other valuable constituents to be recovered from the papaya plants.

As the plants are harvested, it may be advisable to spray the chopped plants with a suitable quantity of preserving solution; such preserving solution may comprise, by way of example, a mixture of ammonia, sulfites, and sufides in the amount of 0.1% of each by weight. Where the preserving solution is used, the concentration may vary without departing from the scope of the invention but may be restricted by various economic factors. Preferably, the pH of the spraying solution is slightly alkaline or neutral, and a pH range of 7 to 9 is satisfactory.

It is not necessary or critical to the present invention to spray the plants as they are harvested, but the yield of valuable constituents obtained from the harvested or chopped plant may be reduced in some instances where the preserving solution is not utilized.

In addition, it should be further noted that the present process is quite suitable not only for recovering carpaines and other valuable constituents from green immature papaya plants, but the more mature or older papaya plants that have been raised primarily for fruit may also be used in practicing the present invention.

Attention is now directed to the schematic flow diagram, and it is to be noted that the harvested plants are represented generally by the numeral 2 and after harvesting may be chopped or macerated as represented by the numeral 3. Where the preserving solution is used, it may be employed by placing it on the papaya plants preferably soon after they are cut or as they are cut or harvested. After chopping the plants, they may be treated with a small quantity of extraction solution to prevent undesirable effects of oxidation and enzyme inactivation. Here again, this step may be eliminated without departing from the scope of this invention. The extraction solution may be added in any suitable manner, and it has been found that spraying the chopped plants with the extraction solution is quite satisfactory. Of course, the chopped plants could be dipped in the extraction solution, or the extraction solution may be applied in any one of several other ways.

Any alkaline enzyme protecting solution may be used as the extraction solution, and one which forms the function of a reducing or antioxidizing agent and a solubilizing or peptizing agent for aiding in the protection, liberation, and activation of the proteolytic enzymes. By way of example, some suitable reducing or antioxidizing agents which have been found suitable are the sulfites and bisulfites of sodium and potassium, sulfur dioxide, the sulfides and hydrosulfides of ammonium, sodium, and potassium, hydrogen sulfide, glutathionine, methionine, cystein, thioglycolates, and cyanides. Out of this group, the sulfites and bisulfites of sodium and hydrosulfides of ammonium and sodium are preferred, but the others may be used if desired.

Where the enzymes are to be recovered from the same plants, then it is preferable to use or employ a papain-like enzyme activator, such as by way of example, the sulfites of sodium and potassium, the sulfides of sodium and potassium, the bisulfites of sodium and potassium, hydrosulfides and sulfides of ammonium, sodium, and potassium, certain metal chelating agents (versene, sequestrene) like diethylenetetra amino acetic acid and its soluble salts, hydrocyanic acid and its sodium and potassium salts. Among this group, the sulfides of sodium, the bisulfites of sodium, hydrosulfides of ammonium and diethylenetetra amino acetic acid and its soluble salts are preferred.

Among the solubilizing or peptizing agents, the following are desirable: chlorides of sodium and ammonium, phosphates of sodium and potassium, various meta- and polyphosphates of sodium and potassium, sodium citrate, hydrotropic agents such as sodium benzene sulfonate and sodium paracymene sulfonate. Among these, the chlorides of sodium and ammonium, polyphosphates of sodium, and sodium citrate are preferred. Also, sodium sulfite, the bisulfides and sulfides of ammonium and sodium, and ascorbic acid and its soluble salts are quite satisfactory. Generally speaking, any dilute salt solution will function satisfactorily.

Concentration of the chemicals may be in the neighborhood of 0.1% by weight, and concentrations in the range of 0.1% to 0.25% by weight are satisfactory. Lower concentrations are generally ineffective, and higher concentrations are not necessary to accomplish the results.

After the chopped mass of green papaya plants have been thoroughly moistened, they are next treated to separate a liquor or liquid from the pulpous mass of the papaya plants; and suitable means may be used to separate the liquids from the pulp, such as by way of example, pressing. When pressing is employed, it may be accomplished by any suitable apparatus, such as a filter press or the like to separate the liquid from the pulp. Of course, the liquid may be extracted by any means, mechanical or chemical, which does not have deleterious effects on the desired constituents to be recovered.

It is desirable to rewet the pulpous mass with the extraction solution in order to extract more of the proteolytic enzymes and other constituents, and this may be done by adding to the wet pulp a volume of the extraction solution about equal to the volume of liquid obtained in the first pressing operation. The wet pulp is then pressed as before to obtain a second portion of liquor and the resulting pulpous mass.

The pulpous mass may be dehydrated in a conventional dehydration kiln to make papaya pulp which can be used as an animal feedstuff which contains a good amount of protein and is quite rich in carotene or provitamin A. In the flow sheet, the extraction solution is illustrated by the numeral 4, and it can be seen that it is added as illustrated at 5 to the chopped papaya plants and is added as illustrated at 6 to the rewet pulp.

After the pressing to separate the liquid from the pulp, the pressings yield 75% to 90% of the total desired constituents. The liquids are combined as illustrated at 7 and 8 for subsequent processing. The pulpous mass obtained from the press 9 is represented at 10 and as noted above is dehydrated at 11 to produce the animal feedstuff represented by the numeral 12.

The two pressings of the plants yield 75% to 90% of the total desired constituents available from the plants, and while more rewettings and pressings give higher yields, the purification difficulties of the enzymes later in the process appear to be increased.

Of course, the number of rewettings and pressings may be varied as desired.

The combined liquors or liquids represented at 7 and 8 from the pressing may be green in color and may have a pH in the neighborhood of 8. At any event, regardless of the color and regardless of the pH, the pH of the liquid is adjusted to between 4.0 and 4.5 by the addition of an acidifying agent as represented by the numeral 13 in the drawing. The acidifying agent may be any suitable acid such as hydrochloric, sulfuric, citric acetic, or phosphoric, by way of example only.

After the pH of the liquid has been adjusted, the liquid is digested preferably by carefully raising the temperature to approximately between 40° and 55° C. In this regard, it should be noted that any localized overheating of the liquid will tend to destroy the proteolytic enzyme activity. Papain, like all enzymes, is destroyed by heat, but at temperatures below 55° C., the rate of destruction is quite low while at higher temperatures the rate of destruction increases rapidly. The heating of the liquid effects enzymic digestion which liberates and otherwise activates the proteolytic enzymes and at the same time causes a coagulation of the protein impurities.

The enzymic digestion is continued until proper coagulation has been obtained, and I have determined that the time required to produce the desired results usually is between 10 and 30 minutes depending upon the particular papaya plants from which the liquids were obtained. In this regard, if the temperature of the liquid is raised carefully and uniformly, the coagulation will be effected at the lowest possible temperature thereby producing the most active papain from the plants.

The time of heating and the temperature of heating is not critical except that where heating is employed, it must be accomplished in a manner so as to not destroy the proteolytic enzyme activity as the coagulate is being formed. Generally speaking, it is undesirable to heat the liquid to more than 55° C. where it is desired to recover the papain. It can be appreciated that the heating can be carried out at temperatures below 40° C. and over an extended period of time, if desired, one of the primary limiting factors being that the liquid must be digested until a coagulate is formed.

Once the coagulate has been formed, the coagulate can be separated from the liquid by any suitable means such as filtration, centrifugation, or simple settling. The formation of the coagulate may be termed a "break" which is clearly visible to the eye in that the liquid seems to curdle and separate into coagulum which may be green in color and a clear solution. Of course, any suitable instrumental means may be used to determine the occurrence of this phenomenon.

Since the coagulate is mainly protein, it may be advisable to add some filter aid at this point in order to effect more rapid filtration and optimum clarification of the liquid. The clarified liquid can be further purified by treatment with activated carbons and/or filter aids to produce a relatively sparkling clear solution or liquid, which may then be concentrated from their 3% to 5% solids content to some 30% or 50% solids content by means of vacuum concentration. In this regard, it should be again noted that temperatures above 55° C. should be avoided if it is desired to recover the proteolytic enzymes from the liquid phase since temperatures above this increase loss in enzymic activity.

In the flow diagram, the enzymatic digestion is represented by the numeral 14 and the separation at 15. The coagulate illustrated at 16 is a rich source of chlorophylls, carotenes, xanthophylls, and protein.

My copending applications Serial No. 383,890, and Serial No. 383,891, entitled, respectively, "Method for Recovering Chlorophylls from Papaya Plants" and "Method for Recovering Carotenoids Phytol from Papaya Plants" describe and claim a process of recovering these products from the green coagulum.

If desired, the protein may be separated from the coagulate 16 and added back to the papaya pulp feedstuff represented by the numeral 12. The generally clear or milky liquid separated from the coagulate is illustrated at 17 as being purified as noted above and concentrated as illustrated at 18 and as noted hereinabove.

After the liquids have been purified and concentrated at 18, the proteolytic enzymes may be separated therefrom by standard procedures as represented at 19 in the flow sheet. For example, the concentrated enzyme solution represented at 18 may be treated with one of the precipitating enzyme solvents such as acetone, methanol, ethanol, isopropanol, and the precipitated enzymes are then separated as illustrated or as referred to at 20 from the remaining liquors by filtration, centrifugation, or simple settling, followed by decantation.

The precipitated enzymes are refined by various purifying processes as generally referred to by the numeral 21 in the flow sheet and as described in my copending application Serial No. 1,050, now United States Patent No. 3,141,832.

The carpaine mother liquors represented by the numeral 25 are distilled by conventional means to recover the enzyme precipitating solvent as illustrated by the numeral 26 and return it to the system as shown at 26a in the drawings and to produce carpaine liquor concentrate 27. The carpaine concentrate may be quite acidic, the exact pH of which is dependent upon the amount and kind of acid used in the enzymatic digestion, but generally ranges between 1 and 3.

The pH of the carpaine concentrate represented at 27 is made alkaline within the range of approximately 9 to 11 by the addition, represented at 27a, of any suitable alkali such as sodium hydroxide, potassium hydroxide, sodium carbonate, potassium carbonate, by way of example. When the carpaine concentrate is alkalinized, it is then solvent extracted with one of the carpaine solvents such as benzene. The carpaine solvents per se are well known in the art, and benzene has been found to be quite satisfactory in the process; however, it should be understood that the present invention is not restricted to this particular carpaine solvent as such.

The solvent extraction of the carpaine concentrate is represented by the numeral 28 in the schematic flow sheet, and a simple separation step by any suitable means such as decantation is carried out as represented at 29 to separate the carpaines and solvent from the carpaine free extract portion represented by the numeral 30. The organic solvent and carpaine phase is distilled as represented by the numeral 31 in the flow sheet, at which time the solvent is separated from the crude carpaines represented at 32. The solvent may be conducted back to the portion of the method or process as represented by the numeral 35 for reuse.

The crude carpaines obtained at the portion of the process represented by the numeral 32 may be readily crystallized from organic solvents such as acetone, methanol, ethanol, and low molecular weight ketones. In general, any organic solvent that is water soluble or in which the carpaines are soluble such as ethyl ether will function quite satisfactorily for this purpose.

The refined carpaines are illustrated as having been obtained at 33 in the flow sheet.

The following examples are given by way of illustration only and are not intended as any limiting factor upon the present invention.

*Example 1*

Freshly harvested young papaya plants were chopped and immediately dipped in a solution containing 0.1% of sodium bisulfite, 0.1% of tetrasodium diethylenetetraamino acetate and enough sodium hydroxide to bring the pH to 8.5. After draining off the excess chemical solution, the chopped pieces were thoroughly macerated. A portion of this macerated mixture, weighing 1000 grams was pressed to yield 450 (approximately 430 ml.) of green liquor. The remaining pulpous mass was thoroughly mixed with 450 grams of the extracting solution, having the same composition as the above mentioned dipping solution. This mass was then pressed to yield 480 grams of green liquor and about 520 grams of pulpous mass. The pulpous mass was completely dehydrated at 103° C. to yield 155 grams of dehydrated papaya pulp. The green liquors were combined and the pH was lowered from its original value of 7.8 to 4.2 by adding dilute hydrochloric acid and then 20 grams of filter aid. Mild agitation was started, and the temperature was slowly raised to 45° C. over a period of about 30 minutes, during which time a green coagulm or coagulate formed. The separation of the green coagulum was accomplished by filtration, followed by washing the coagulum with a small amount of fresh extracting solution. The green coagulum or coagulate weighed 68.2 grams when wet, and 32.1 grams when oven dried.

The combined filtrates were treated according to Serial No. 1,050, now U.S. Letters Patent No. 3,141,832. Briefly, this consists of a purification of the enzyme solution following the separation of the green coagulum through the use of activated carbons and filter aids, and concentrations of the purified enzyme solution in a vacuum concentration at temperatures preferably not exceeding 55° C. to a relatively thick syrup, the volume of which was estimated to be about 70 ml.; 265 ml. of 95% ethanol to serve as the precipitating enzyme solvent was then added to the concentrated enzyme solution to form an almost white mass of precipitated enzymes, and the separation was made by suction filtration. The precipitated enzymes were washed with a small amount of absolute ethanol and then vacuum dried to yield 1.59 grams of high quality proteolytic enzyme. The proteolytic enzymes thus recovered can be further refined or processed into various commercial grades as in the proteolytic enzyme refining step.

The ethanolic filtrates during the separation step are combined as the carpaine mother liquors and then subjusted to distillation to recover solvents, which was ethanol in this example, for reuse as the precipitating enzyme solvent. The distillation step also produced a carpaine concentrate having a pH of 3.0 to which an excess of sodium carbonate was added which brought the pH close to 10, that is, definitely alkaline, and this solution was subjected to a simple solvent extraction using 100 ml. of benzene as the carpaine solvent which was recovered by distillation to leave a residue of crude carpaines. The crude carpaine residue was dissolved in 25 ml. of absolute ethanol, filtered, and allowed to crystallize. A yield of 48 mg. of white carpaines was recovered upon separation and drying that melted between 120° C. and 121° C.

*Example 2*

The top of a mature papaya plant was cut off, then chopped into pieces between 1 and 2 inches long, and these plants were sprayed with a solution containing 0.1% of sodium sulfite and enough ammonium hydroxide to raise the pH to 9.5 to wet and preserve them. These chopped and sprayed pieces were next thoroughly macerated to form a well mixed mass of green papaya plant material. A portion weighing 2000 grams was then pressed to yield 850 grams (about 825 ml.) of a green liquor and a pulpous mass that was rewet with 850 grams of a chemical solution containing 0.1% of sodium sulfite, 0.1% of tetrasodium diethylenetetraamino acetate and enough sodium hydroxide to bring the pH to 8.5 and thoroughly mixed to insure a good extraction of the proteolytic enzymes and carpaines. The mass was again pressed to yield 910 grams (about 880 ml.) of green liquor and about 1090 grams of pulpous mass. Oven drying the latter yielded 298 grams of dehydrated papaya pulp.

The green liquors obtained by the pressing operation were combined, and the pH lowered from its original value of 7.9 down to 4.4 by the addition of dilute hydrochloric acid. Mild agitation was started and then 40 grams of supercel (filter aid) was added, and the temperature was slowly raised from room temperature to 40° C. over a period of about 45 minutes, during which time a visible break occurred; however, the heating was continued until a temperature of 45° C. was reached which was maintained for ten minutes. The separation of the green coagulum was accomplished by suction filtration, and the filter cake was washed with a small amount of the chemical extraction solution. Oven drying yielded 81.5 gm. Purification of the filtrate was accomplished by adding 10 grams of activated carbon, reheating to 40° C. with agitation, holding at this temperature for ten minutes, adding 10 grams of supercel filter aid, and filtering to obtain a practically colorless solution. Concentration was accomplished by distillation of the water under a 27-inch vacuum until a thick syrupy concentrated enzyme solution was produced, the volume of which was estimated as 120 ml., and 600 ml. of methanol was added to serve as the precipitating enzyme solvent.

Filtration was used in the separation step to recover the proteolytic precipitated enzymes which upon washing with a small amount of ethanol absolute and drying yielded 2.88 grams of high quality proteolytic enzymes and constitutes the proteolytic enzyme refining step. The filtrate or carpaine mother liquors were fractionally distilled to recover methanol for reuse as the precipitating enzyme solvent, and the still residue constituted the carpaine concentrate. The syrupy carpaine concentrate was transferred to a simple glass solvent extraction apparatus which required the addition of a small amount of water; alkali as potassium carbonate was added to make it definitely alkaline (pH 10), and then exhaustively extracted with 150 ml. of benzene as the carpaine solvent. Separation was automatically accomplished in the glass solvent extractor to produce the carpaine free extract and a benzene extract of the carpaines which was given a steam distillation to recover the solvent (benzene) for reuse and to produce a residue of crude carpaines. This mass of crude carpaines was taken up in 50 ml. warmed acetone, filtered, and allowed to slowly evaporate, whereupon carpaine crystals formed. The crystals were separated by filtration and washed with a very small amount of pentane and then dried to yield 108 mg. of refined carpaines.

*Example 3*

Four rapidly growing papaya plants between 3 and 4 feet tall were taken as samples by cutting the trunks about 12 inches above the ground surface. They were chopped into small pieces and sprayed with a chemical preserving solution containing 0.1% of sodium sulfite and 0.04 sodium hydroxide to thoroughly wet them. They were next thoroughly macerated, and 200 grams of the well mixed mass pressed to produce 920 grams of a green liquor, and the pressed pulpous mass was rewet with 920 grams of a chemical solution containing 0.1% sodium bisulfite, 0.5% tetrasodium diethylenetetraamino acetate, and the pH adjusted to 9 with sodium hydroxide. The rewet mass was thoroughly mixed and pressed to produce 950 grams of green liquor and about 1,050 grams of pulpous mass. The latter upon drying produced 265 grams of dehydrated papaya pulp which upon assay was found to contain: protein, 14.2%; fiber, 10.7%; fat, 5.6%; chlorophyll, 1.75%; and 192,000 I.U. of vitamin A per pound. The combined green liquors had a pH of 8.3, which was lowered to 4.3 by the addition of dilute sulfuric acid. Stirring was started, and 40 grams of filter aid was added and the temperature gradually raised to 38° C. in about 40 minutes, at which time a visible break could be seen, and the temperature held at this point for another ten minutes.

Suction filtration was used to effect the separation, and the green coagulum filter cake was washed with a small quantity of water. When oven dried at 103° C., 134.5 grams of dry material was recovered. The purification and concentration step was accomplished by adding 15 grams of activated carbon and raising the temperature to 40° C., holding for ten minutes, then adding 15 grams of filter aid, and finally filtering to obtain an almost colorless clear solution that was concentrated under 28 inches of vacuum to form a quite thick syrupy concentrated enzyme solution. Its volume was estimated at about 160 ml., and 500 ml. of 99% isopropanol was added as the precipitating enzyme solvent, and the precipitated enzymes separated by suction filtration following settling and then washing with a small volume of 99% isopropanol and finally drying in vacuum to produce 2.10 grams of proteolytic enzyme which could then be refined into any of the desirable refined commercial products.

The isopropanol filtrate or carpaine mother liquors were fractionally distilled to recover the solvent (isopropanol) for reuse as the precipitating enzyme solvent. The residue or carpaine concentrate was found to be quite acid (pH about 2), after transferring it to the automatic glass extractor. Sodium hydroxide solution was added to bring the pH up to 10, then treated to the solvent extraction using 200 ml. of benzene as the carpaine solvent to leave a carpaine free extract. The benzene extract was steam distilled to remove and recover solvents for reuse leaving a crude carpaine residue. The residue was taken up in 50 ml. of acetone; solution was aided by slightly heating and then filtered and allowed to slowly evaporate to produce carpaine crystals which were recovered by suction filtration, and while still on the filter, they were washed with a small portion of pentane. Upon drying, 98 mg. of refined carpaines was obtained. The crystals melted between 120° C. and 121° C.

Broadly, the present invention relates to a method of recovering carpaines from all air parts of papaya plants without destroying other valuable constituents present in the plants and without interfering with their recovery.

What is claimed is:

1. A method of recovering carpaines from papaya plants comprising the steps of:
    (a) extracting a liquid from the plants,
    (b) adjusting the pH of the liquid to the range of approximately 4.0 to 4.5,
    (c) digesting the liquid until a coagulate is formed therein,
    (d) separating the liquid from the coagulate,
    (e) adding an alkali thereto to adjust the pH of the liquid to the range of approximately 9 to 11,
    (f) solvent extracting the alkalinized liquid with an organic solvent in which carpaines are soluble to recover the carpaines from the liquid,
    (g) separating the solvent and the carpaines, and
    (h) refining the separated carpaines to produce refined carpaines.

2. The method of recovering proteolytic enzymes and carpaines from papaya plants comprising the steps of:
    (a) extracting a liquid from the plants,
    (b) adjusting the pH of the liquid to the range of approximately 4.0 to 4.5,
    (c) digesting the liquid at not more than approximately 55° C. until a coagulate is formed therein,
    (d) separating the liquid from the coagulate,
    (e) treating the liquid with an enzyme precipitating solvent to separate the proteolytic enzymes from the liquid,
    (f) treating the remaining liquids to recover the enzyme separating solvent therefrom,
    (g) adding an alkali thereto to adjust the pH of the liquid to the range of approximately 9 to 11,
    (h) solvent extracting the alkalinized liquid with an organic solvent in which carpaines are soluble to recover the carpaines from the liquid,
    (i) separating the solvent and the carpaines, and
    (j) refining the separated carpaines to produce refined carpaines.

3. A method of treating papaya plants to recover proteolytic enzymes and carpaines comprising the steps of:
    (a) treating the plants with an extraction solution including a reducing agent, papain activator, and a solubilizing agent,
    (b) extracting a liquid from the plants,
    (c) adjusting the pH of the liquid to the range of approximately 4.0 to 4.5,
    (d) digesting the liquid at not more than approximately 55° C. until a coagulate is formed therein,
    (e) separating the liquid from the coagulate,
    (f) treating the liquid with an enzyme precipitating solvent to separate the proteolytic enzymes from the liquid, (g) treating the remaining liquids to recover the enzyme separating solvent therefrom, (h) adding an alkali thereto to adjust the pH of the liquid to the range of approximately 9 to 11, (i) solvent extracting the alkalinized liquid with an organic solvent in which to recover the carpaines from the liquid, (j) separating the solvent and the carpaines, and (k) refining the separated carpaines to produce refined carpaines.

4. The method of claim 1 wherein the alkalinizing agent is selected from the following: sodium hydroxide, potassium hydroxide, sodium carbonate, calcium hydroxide, ammonium hydroxide, and potassium carbonate.

5. The method of claim 2 wherein the alkalinizing agent is selected from the following: sodium hydroxide, potassium hydroxide, sodium carbonate, calcium hydroxide, ammonium hydroxide, and potassium carbonate.

6. The method of claim 3 wherein the alkalinizing agent is selected from the following: sodium hydroxide, potassium hydroxide, sodium carbonate, calcium hydroxide, ammonium hydroxide, and potassium carbonate.

7. The method of claim 2 wherein the pH of the liquid prior to coagulation is adjusted by the addition of any of the following: hydrochloric acid, sulfuric acid, citric acid, acetic acid, and phosphoric acid.

8. The method of claim 3 wherein the pH of the liquid prior to coagulation is adjusted by the addition of any of the following: hydrochloric acid, sulfuric acid, citric acid, acetic acid, and phosphoric acid.

9. The method of claim 1 wherein the refining of the carpaines is effected by crystallization from any of the following solvents: acetone, methanol, ethanol, and low molecular weight ketones.

10. The method of claim 1 wherein the refining of the carpaines is effected by crystallization from any organic solvent which is water soluble or in which the carpaines are soluble.

11. The method of claim 2 wherein the refining of the carpaines is effected by crystallization from any organic solvent which is water soluble or in which the carpaines are soluble.

12. The method of claim 3 wherein the refining of the carpaines is effected by crystallization from any organic solvent which is water soluble or in which the carpaines are soluble.

13. The method of claim 2 wherein the refining of the carpaines is effected by crystallization from any of the following solvents: acetone, methanol, ethanol, and low molecular weight ketones.

14. The method of claim 3 wherein the refining of the carpaines is effected by crystallization from any of the following solvents: acetone, methanol, ethanol, and low molecular weight ketones.

15. The method of claim 1 wherein the solvent used in the solvent extraction of the alkalinized liquids for recovery of the carpaines is any organic solvent in which the carpaines are soluble.

16. The method of claim 2 wherein the solvent used in the solvent extraction of the alkalinized liquids for recovery of the carpaines is any organic solvent in which the carpaines are soluble.

17. The method of claim 3 wherein the solvent used in the solvent extraction of the alkalinized liquids for recovery of the carpaines is any organic solvent in which the carpaines are soluble.

18. A method of treating papaya plants to recover carpaines therefrom comprising the steps of:
  (a) treating the plants with a nonorganic solution and extracting the plants to recover a liquid portion and a pulpous mass,
  (b) digesting the liquid portion until a coagulate is formed therein, and
  (c) recovering the carpaines from the liquid portion after the coagulate is formed therein.

19. A method of treating papaya plants to recover carpaines therefrom comprising the steps of:
  (a) treating the plants with a nonorganic solution and extracting the plants to recover a liquid portion and a pulpous mass,
  (b) digesting the liquid portion until a coagulate is formed therein,
  (c) separating the coagulate,
  (d) adding an alkali to the liquid portion to adjust the pH of the liquid to the range of approximately 9 to 11, and
  (e) recovering the carpaines from the liquid portion.

References Cited by the Examiner

UNITED STATES PATENTS 3,141,832  7/1964  Burdick _____ 195—66

OTHER REFERENCES

Burdick Chemurgic Digest, July 1957, vol. 16, No. 7, pages 4 to 6 and 12.

Rapoport et al.: JACS 73, 343 to 346 (1951).

A. LOUIS MONACELL, *Primary Examiner.*